United States Patent
Kojima et al.

(10) Patent No.: US 8,581,699 B2
(45) Date of Patent: Nov. 12, 2013

(54) PORTABLE EQUIPMENT DETECTING SYSTEM

(75) Inventors: Masahito Kojima, Kariya (JP); Kazuhiro Nakashima, Anjo (JP); Takeshi Kumazaki, Okazaki (JP)

(73) Assignee: Denso Corporation, Kariya (JP)

( * ) Notice: Subject to any disclaimer, the term of this patent is extended or adjusted under 35 U.S.C. 154(b) by 445 days.

(21) Appl. No.: 13/047,110

(22) Filed: Mar. 14, 2011

(65) Prior Publication Data

US 2011/0223868 A1 Sep. 15, 2011

(30) Foreign Application Priority Data

Mar. 12, 2010 (JP) ................................ 2010-056517

(51) Int. Cl.
  *G08B 25/00* (2006.01)
(52) U.S. Cl.
  USPC ........................................................ 340/8.1
(58) Field of Classification Search
  USPC ............... 340/8.1, 5.2, 5.61; 307/10.1
  See application file for complete search history.

(56) References Cited

U.S. PATENT DOCUMENTS

| | | | |
|---|---|---|---|
| 7,046,119 B2 * | 5/2006 | Ghabra et al. | 340/5.72 |
| 7,850,078 B2 * | 12/2010 | Christenson et al. | 235/382 |
| 2008/0048829 A1 | 2/2008 | Nakajima et al. | |

FOREIGN PATENT DOCUMENTS

| | | |
|---|---|---|
| JP | 2000-255381 | 9/2000 |
| JP | 2005-076329 | 3/2005 |
| JP | 2005-105715 | 4/2005 |
| JP | 2007-132119 | 5/2007 |
| JP | 2007-303167 | 11/2007 |
| JP | 2010-060457 | 3/2010 |
| JP | 2011-127368 | 6/2011 |
| JP | 2011-147104 | 7/2011 |

\* cited by examiner

*Primary Examiner* — Vernal Brown
(74) *Attorney, Agent, or Firm* — Harness, Dickey & Pierce, PLC (57) ABSTRACT

A portable equipment detecting system includes an antenna having a first element of which a longitudinal direction is defined as a running direction of the vehicle, a second element of which longitudinal direction is defined as a direction perpendicular to the running direction of the vehicle and the vertical direction of the vehicle, and a bypass wiring of which one end is connected to a connection point between the first and second elements; and detecting circuit adapted to switch between three power-supplied states of the antenna including a first supplied state, a second supplied state and a third supplied state, and to detect a location of the portable equipment based on an acknowledge signal from the portable equipment when the power-supplied state is switched.

8 Claims, 8 Drawing Sheets

PORTABLE EQUIPMENT DETECTING SYSTEM

CROSS REFERENCE TO RELATED APPLICATION

This application is based on and claims the benefit of priority from earlier Japanese Patent Application No. 2010-056517 filed on Mar. 12, 2010, the description of which is incorporated herein by reference.

BACKGROUND OF THE INVENTION

1. Field of the Invention

The present invention relates to communication systems mounted on vehicles, and more particularly to an on-vehicle wireless communication system for detecting a portable equipment mutually communicable with a communication apparatus mounted on a vehicle.

2. Description of the Related Art

Conventionally, a communication apparatus for vehicles have been employed to communicate with various portable equipments. Particularly, a Japanese Patent Application Laid-Open publication No. 2007-132119 discloses a communication apparatus for vehicle in which a portable equipment and an on-vehicle equipment are communicable with each other with less number of on-vehicle antennas.

This communication apparatus is provided to enhance efficiency of the power-transmission to the portable equipment. The communication apparatus is configured to include an on-vehicle equipment and a portable equipment that user of the vehicle owns. The on-vehicle equipment includes a transmission/reception antenna in which direction of the output beam can be changed arbitrarily, a person-approaching detecting means for detecting a door lock/unlock signal and an antenna adjusting means for adjusting direction of the transmission/reception antenna to be directed to a direction of the person approaching. When the on-vehicle equipment detects the door lock-unlock signal, then transmits electromagnetic waves used for supplying electric power towards a direction where the door lock-unlock signal is detected as a radio wave having strong directivity. Subsequently, the on-vehicle equipment transmits an enable signal that enables vehicle-doors to be locked/unlocked when the portable equipment is authorized based on a result of exchanging communication signals between the on-vehicle equipment and the portable equipment.

In the above-described communication apparatus for vehicle, person who is approaching to the vehicle can be detected by a signal sent from a switch disposed on each door handle of the vehicle. Alternatively, the communication apparatus can be configured to change the directivity of the transmission/reception antenna to be a single beam, to transmit the single beam so as to sequentially scan a plurality of directions including respective windows of the vehicle, and to receive incoming electro-magnetic waves (reflected waves) sequentially from the plurality of directions via the transmission/reception antenna. Subsequently, the communication apparatus extracts a direction where the radio beam having highest electric power is received and estimates the person is approaching from the detected direction.

Thus, the communication apparatus can estimate the direction of the person who is approaching to the vehicle by detecting signals sent from the switch disposed on each door handle and reflected waves resulting from the sequential scanning of the plurality of directions including respective windows. However, location of the portable equipment cannot be detected by this procedure.

When location of the portable equipment is detected, the communication apparatus change the directivity of the transmission/reception antenna to be the single beam and transmits the single beam so as to sequentially scan towards a plurality of directions including respective windows of the vehicle. Then, the communication apparatus extracts a direction of the radio beam when a wakeup-complete signal transmitted from the portable equipment is received by the communication apparatus. Subsequently, based on the extracted direction of the radio beam, the communication apparatus estimates the location/direction of the portable equipment that the person approaching to the vehicle owns.

Thus, in the above-described communication apparatus, it is necessary that the radio beam sequentially scans towards the plurality of directions including respective windows. Therefore, it takes time to detect the location of the portable equipment so that the response time is decreased. Moreover, a mechanism used for rotating the transmission/reception is necessary so that the configuration may become complicated.

SUMMARY

An embodiment provides a portable equipment detecting system in which location of the portable equipment is detected with a fast response time and with a simple configuration.

As a first aspect of the embodiment, the portable equipment detecting system mounted on a vehicle, communicating with a portable equipment by wireless communication thereby detecting a location of the portable equipment, the detecting system includes: an antenna radiating electromagnetic waves, the antenna including a first element, a second element electrically connected in series to the first element, and a bypass wiring of which one end of the wiring is connected to a connection point of the first and second elements, the antenna being arranged such that a longitudinal direction of the first element is defined as a running direction of the vehicle and a longitudinal direction of the second element is defined as a direction perpendicular to both of the running direction of the vehicle and a vertical direction of the vehicle; transmitting means for transmitting a request signal requesting the portable equipment to return an acknowledge signal, the request signal being transmitted to the antenna thereby radiating the electromagnetic waves including the request signal; receiving means for receiving the acknowledge signal from the portable equipment via the antenna which receives the electromagnetic waves including the acknowledge signal; and detecting means for detecting the location of the portable equipment based on the acknowledge signal returned by the portable equipment, wherein power is supplied to the antenna in one of three supplied states including a first supplied state, a second supplied state and a third supplied state, wherein the first supplied state is configured that the bypass wiring and the first element are electrically conducted to supply the power only to the first element, the second supplied state is configured that the bypass wiring and the second element is electrically conducted to supply the power only to the second element and the third supplied state is configured that the power is supplied to the first and second elements, the detecting means is configured to switch between three supplied states and detect the location of the portable equipment based on the acknowledge signal at a time when the supplied state is switched.

According to the above-described configuration, when the first supplied state is set, only the first element of which longitudinal direction is the running direction of the vehicle is powered so that a range of the arriving electromagnetic waves (i.e., transmitting range of the request signal) can be set as inside the passenger cabin. As a result, when the acknowledge signal is detected when the first supplied state is set, the detecting system can determine the portable equipment is inside the passenger cabin.

When the second supplied state is set, only the second element of which longitudinal direction of the second element is a direction perpendicular to both of the running direction of the vehicle and a vertical direction of the vehicle, is powered so that a range of the arriving electromagnetic waves (i.e., transmitting range of the request signal) can be set as inside the passenger cabin and outside the driver's seat area. As a result, when the acknowledge signal from the portable equipment is not detected in the first supplied state and when the acknowledge signal is detected in the second supplied state, the detecting system can determine the portable equipment is outside the driver's seat area and outside the passenger's seat area. Further, when the acknowledge signal from the portable equipment is detected in the first supplied state and the acknowledge signal is not detected in the second supplied state, it is determined that the portable equipment is in trunk space of the vehicle.

Moreover, when the third supplied state is set, since the first and second elements are powered so that the electromagnetic waves radiated from the first element and the electromagnetic waves radiated from the second element have a range of the arriving electromagnetic waves (i.e., transmitting range of the request signal) which is to be outside the driver's seat area and outside the passenger's seat area. Accordingly, when the acknowledge signal from the portable equipment is not detected in the first supplied state and the acknowledge signal is detected when the second supplied state is set and the acknowledge signal is detected in the third supplied state, it is determined that the portable equipment is either outside of the driver's seat area or outside the passenger's seat area.

Thus, according to the above-described detecting system, since only the supplied state to the two-axis (first element and second element) antenna is switched three times, the portable equipment can be detected by using simple configuration and also, the location of the portable equipment can be detected with fast response time.

In the detecting system, the supplied states may further include a fourth supplied state in which power supplied to the first element is higher than that of the first supplied state.

In this configuration, when the fourth supplied state is set, the range of the arriving electromagnetic waves can be set as outside of the vehicle, that is, outside the driver's seat area, outside the passenger's seat side area and outside the trunk space. Hence, when the no acknowledge signal from the portable equipment is detected in the first supplied state and the acknowledge signal is detected in the fourth supplied state and no acknowledge signal is detected in the second supplied state is set, the detecting system can determine the portable equipment is outside the trunk space.

Moreover, in the detecting system, the supplied states may further include a fifth supplied state in which power supplied to the second element is smaller than that of the second supplied state.

Thus, when the fifth supplied state is set, the range of the arriving electromagnetic waves can be set as inside the passenger cabin only. Hence, when the acknowledge signal from the portable equipment is detected in the first supplied state and no acknowledge signal is detected in the fifth supplied state is set, the detecting system can determine the portable equipment is inside the trunk space.

When the battery is used for the portable equipment as a power source, it is considered that the communication between the detecting system and the portable equipment may not be reliably made due to consumption of the battery. In this case, a backup apparatus can be provided in the detecting system to secure the communication between the portable equipment and the portable equipment. This backup apparatus can be arranged at a portion where the portable equipment can be placed in the vehicle. The backup apparatus generates electromagnetic field to be used for the portable equipment when the portable equipment does not return an acknowledge signal nevertheless a start switch disposed in the passenger's cabin is turned ON. Meanwhile, the portable equipment includes a generation circuit for generating electromotive force, and the generation circuit is configured to generate the electromotive force by the electromagnetic field generated by the backup circuit. Therefore, even when the battery power of the portable equipment has been consumed, the communication between the portable equipment detecting system and the portable equipment can be maintained.

Therefore, the detecting system can be configured to include backup circuit that supplies power to the first and second elements to generate electromagnetic field to be used for inducing electromotive force on the portable equipment, and the power supplied to the first and second element is higher than the power when radiating the electromagnetic waves to transmit the request signal.

In this way, an antenna used for the communication between the detecting system and the portable equipment, and an antenna used for the backup can be integrated whereby the number of antennas can be reduced.

In the detecting system, the antenna may further include a third element, and the antenna can be arranged to form three-dimensional shape by the first element, the second element and the third element.

Accordingly, when the antenna is used for the backup circuit, regardless of a direction where the portable equipment is heading, the induced electromotive force can be generated so that the detecting system supports the portable equipment to operate normally. Note that the third element may be arranged to be combined with the bypass wiring.

DETAILED DESCRIPTION OF THE PREFERRED EMBODIMENTS

With reference to the drawings, hereinafter will be described embodiments of the present invention.

First Embodiment

Figure 1:
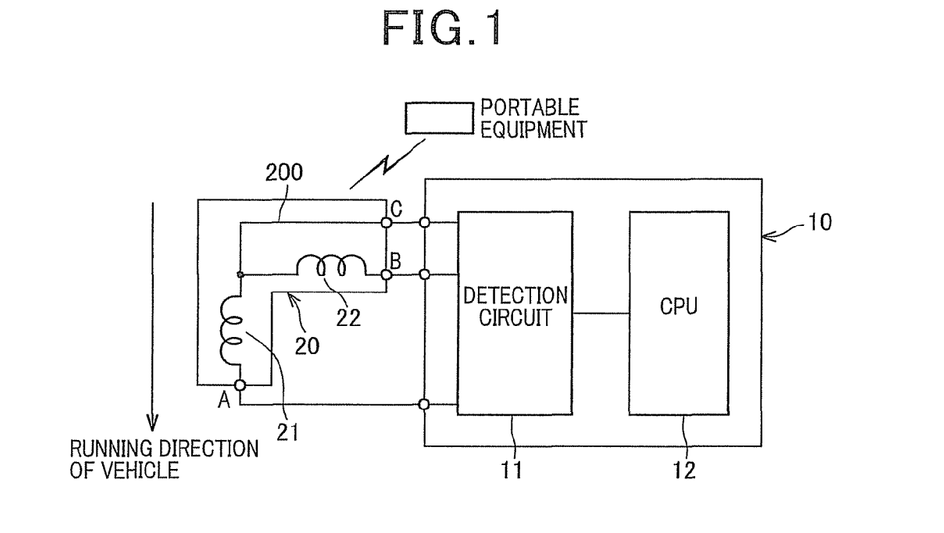
FIG. 1 is a block diagram showing an overall configuration of a portable equipment detecting system according to a first embodiment of the present invention.
Figure 2A:
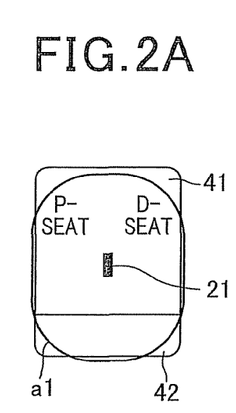
FIGS. 2A, 2B, and 2C are explanatory diagrams showing an arrangement of a first element 21 and a second element 22 of an antenna disposed on the vehicle and a range of arriving electro-magnetic waves according to the first embodiment.
Figure 2B:
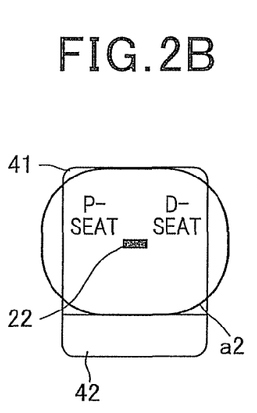
Figure 2C:
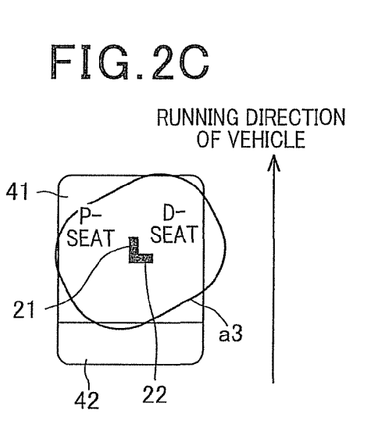
Figure 3:
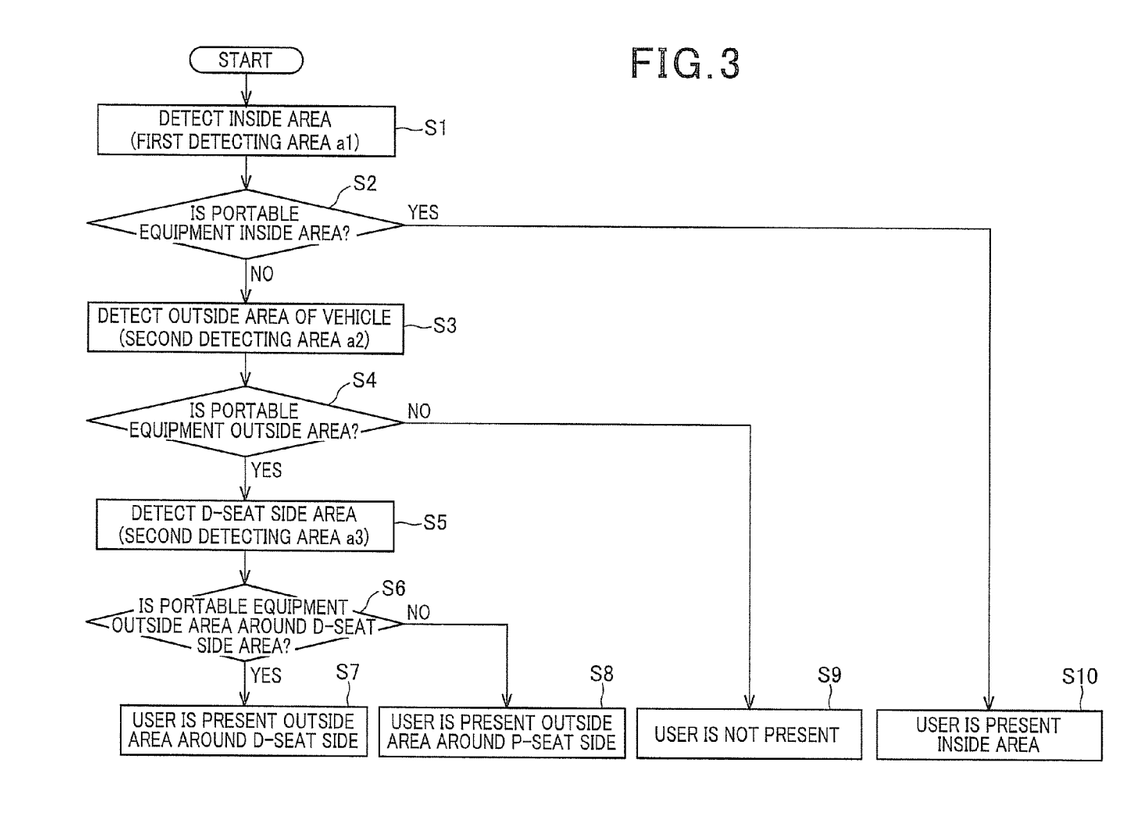
FIG. 3 is a flowchart showing an operation procedure of the portable equipment detecting system according to the first embodiment.

With reference to FIGS. 1 to 3, a portable equipment detecting system according to a first embodiment of the present invention is described as follows. FIG. 1 is a block diagram showing an overall configuration of the portable equipment detecting system according to the first embodiment.

The portable equipment detecting system according to the first embodiment is mounted on the vehicle and configured to mutually communicate with the portable equipment thereby detecting the location of the portable equipment. This portable equipment detecting system is applied to, for example, a smart entry system which is used to control doors of the vehicle to be locked/unlocked based on a verification result of an identification (ID) code exchanged between the detecting system and the portable equipment via a bidirectional communication (mutual communication), and a smart start system which is used to control lock/unlock of the steering and enable/disable starting the engine.

As shown in FIG. 1, the portable equipment detecting system includes a control block 10 and an antenna 20. The control block 10 includes a detection circuit 11 (corresponds to transmitting means, receiving means) and a CPU 12 (corresponds detecting means).

The detection circuit 11 is configured to operate in response to a command from the CPU 12. The detection circuit 11 outputs a request signal to the portable equipment by radiating electromagnetic waves from the antenna 20. The request signal is used to request the portable equipment to return an acknowledge signal. Further, the detection circuit 11 selects configuration of three connection points A, B, and C of the antenna 20 whereby a power-supplied state of the antenna 20 is changed to one of three combinations of the power-supplied states. The directivity of the electromagnetic waves can be changed based on the power-supplied state (described later). The detection circuit 11 includes a reception circuit (not shown). The CPU 12 is configured to verify the ID code included in the acknowledge signal received by the reception circuit by comparing with a pre-registered code and determines whether or not the ID code and the pre-registered code satisfy predetermined relationship e.g. matching code or the like.

The detection circuit 11 is configured to select a state from the three power-supplied states and the CPU 12 detects the location of the portable equipment based on the acknowledge signal from the portable equipment when the power-supplied state is selected (switched). The control block 10 outputs a signal indicating the detected location of the portable equipment to a body ECU (not shown), a Power ECU (not shown), an engine ECU (not shown) and the like. These ECUs are configured to control doors of the vehicle to be locked/unlocked, lock/unlock of the steering and enable/disable starting the engine based on the signal transmitted from the control block 10. In other words, in response to a verification result whether or not the ID code matches with the pre-registered code, respective ECUs (i.e., the body ECU, the Power ECU and the engine ECU) controls state of the doors (lock/unlock), state of the steering (steering lock/unlock) and starting of the engine.

The antenna 20 is designed to radiate the electromagnetic waves used for transmitting the request signal that requests returning an acknowledge signal towards the portable equipment. As shown in FIGS. 1 and 2, the antenna 20 includes a first element 21 and a second element 22 which is electrically connected in series to the first element. The first element 21 is configured such that the longitudinal direction of the first element 21 is defined as a running direction of the vehicle. The second element 22 is configured such that the longitudinal direction of the second element 22 is defined as a direction perpendicular to both of the running direction of the vehicle and the vertical direction of the vehicle. The antenna 20 also includes a bypass wiring which is not capable of radiating the electromagnetic waves. The bypass wiring is arranged such that the one end of the bypass wiring is connected to a connection point between the first element 21 and the second element 22 and the other end is connected to the control block 10. The first and second elements are designed to radiate LF (low frequency) band waves (frequency range is around 120 KHz to 135 KHz). It is noted that the bypass wiring 200 can be disposed outside the antenna 20.

Further, as shown in FIG. 1, the antenna 20 includes three connection points A, B and C being connected to the control block 10. The first element 21 is disposed between one end of the second element 22 and the connection point A. The second element 22 is disposed between one end of the first element 21 and the connection point B. The bypass wiring 200 is disposed between the connection point of the first/second elements, and the connection point C.

FIGS. 2A to 2C are explanatory diagrams showing an arrangement of a first element 21 and a second element 22 in the vehicle and a range of arriving electro-magnetic waves. This range of arriving electromagnetic waves is defined as a range to which the request signal is transmitted and the portable equipment is detected in this range. Therefore, this range is referred to a portable equipment detecting area (i.e., first detecting area, second detecting area, third detecting area, fourth detecting area and fifth detecting area). As shown in FIGS. 2A to 2C, symbol 41 shows a passenger cabin and symbol 42 shows a trunk space. It is noted that the running direction of the vehicle is defined as the up direction of FIGS. 2A to 2C.

As described above, the detection circuit 11 changes the configuration of three connection points A, B, and C of the antenna 20 whereby power-supplied state of the antenna 20 is switched to one of three power-supplied states. Specifically, the detection circuit 11 selects the configuration to be one of three power-supplied states including a first power-supplied state in which the bypass wiring 200 and the first element 21 are electrically conducted, a second power-supplied state in which the bypass wiring 200 and the second element 22 are electrically conducted, and a third power-supplied state in which the first element 21 and the second element 22 are electrically conducted. The first power-supplied state is provided when the connection points A and C turn ON (connected) and the connection point B turns OFF (disconnected), the second power-supplied state provided when the connection points B and C turn ON and the connection point A turns OFF, and the third power-supplied state is provided when the connection points A and B turn ON and the connection point C turn OFF.

Thus, the detection circuit 11 switches power-supplied states (three states) of the antenna 20 whereby the detecting area for the portable equipment can be switched. For instance, when the power-supplied states is the first power-supplied state, as shown in FIG. 2A, the power is supplied only to the first element 21 of which longitudinal direction equals to the running direction of the vehicle so that the detecting area for the portable equipment becomes inside the vehicle. The detecting area represented by FIG. 2A is referred to the first detecting area a1.

Similarly, as shown in FIG. 2B, when the second power-supplied state is set, the power is supplied to the second element 22 of which longitudinal direction equals to a direction perpendicular to both of the running direction of the vehicle and the vertical direction of the vehicle so that the detecting area for the portable equipment can be inside the passenger cabin 41, outside the driver's seat (D-seat in FIG. 2B) side and outside the passenger's seat (P-seat in FIG. 2B) side. The detecting area represented by FIG. 2B is referred to the second detecting are a2.

Moreover, as shown in FIG. 2C, when the third power-supplied state is set, the power is supplied to both of the first element 21 and the second element 22, the electromagnetic waves radiated by the first element 21 and the electromagnetic waves radiated by the second element 22 influence each other whereby the detecting area of the portable equipment can be inside the vehicle and the outside driver's seat side or the outside passenger's seat side (In this embodiment, the detecting area is set as the vehicle inside and the outside the driver's seat side). The detecting area represented by FIG. 2C is referred to the third detecting are a3.

With reference to a flowchart of FIG. 3, hereinafter is described an operating procedure of the portable equipment detecting system. It is noted that the operating procedure as shown in the flowchart of FIG. 3 is activated when the all doors are closed and the all doors are locked and repeatedly executed at a predetermined period.

First, at step S1, inside area of the vehicle is detected. The detection circuit 11 controls the connection points A and C to be ON and controls the connection point B to be OFF so that the first power-supplied state is set where the power is supplied to the first element 21 via the bypass wiring 200 and the first element 21. As shown in FIG. 2A, since the power is supplied to the first element of which longitudinal direction equals to the running direction of the vehicle, the first detecting area a1 can be formed. In other words, the request signal is transmitted within the first detecting area a1.

At step S2, it is determined whether or not the portable equipment is inside the vehicle. That is to say, when the first detecting area a1 is formed as the first power-supplied state, the CPU 12 verifies the ID code included in the acknowledge signal transmitted by the portable equipment by comparing with the pre-registered code and then, based on the verification result (i.e., true or false), the CPU 12 determines whether or not the portable equipment is inside the vehicle. When the verification result is true, it is determined that the portable equipment is inside the vehicle. i.e., detect user inside the vehicle (S10). When the verification result is false, it is determined that the portable equipment is not in the vehicle inside, and proceeds to step S3.

At step S3, outside area of the vehicle is detected. The detection circuit 11 controls the connection points B and C to be ON and controls the connection point A to be OFF so that the second power-supplied state is set where the power is supplied to the second element 22 via the bypass wiring 200 and the second element 22. As shown in FIG. 2B, only the second element is power-supplied. Since the longitudinal direction of the second element 22 is defined as a direction perpendicular to both of the running direction of the vehicle and the vertical direction of the vehicle, the second detecting area a2 is formed. In other words, the request signal is transmitted within the second detecting area a2.

At step S4, it is determined whether or not the portable equipment is outside the vehicle (outside the driver's seat side, outside the passenger's seat side). The CPU 12 determines whether or not the portable equipment is the outside the vehicle based on the verification result of the ID code included in the acknowledge signal while the second power-supplied state is set (the second detecting area a2 is formed). When the verification result is true at step S4, the CPU 12 determines that the portable equipment is outside the vehicle since the portable equipment is not in the vehicle (No at step S2) and proceeds to step S5. On the other hand, when the verification result is false, the CPU 12 determines that user is not present (S9) since the portable equipment is not present in the vehicle (No at step S2).

At step S5, detecting area is set to be the driver's seat side (D-seat side) area. The detection circuit 11 controls the connection points A and B to be ON and controls the connection point C to be OFF whereby the third power-supplied state is set. As shown in FIG. 2C, the power is supplied to both the first element 21 and the second element 22 so that the third detecting area a3 is formed by interaction of two electromagnetic waves radiated from the first element 21 and the second element 22. In other words, the request signal is transmitted within the third detecting area a3.

At step S6, it is determined whether or not the portable equipment is on outside the driver's seat side (D-seat side) area. The CPU 12 determines whether or not the portable equipment is outside the vehicle based on the verification result of the ID code included in the acknowledge signal while the third power-supplied state is set (the third detecting area a3 is formed). When the verification result is true at step S6, the CPU 12 determines that the portable equipment is on the outside the driver's seat side (D-seat side). i.e., detect user outside the driver's seat side (S7). On the other hand, when the verification result is false, the CPU 12 determines that the portable equipment is outside the vehicle (YES at step S4) and is not on the outside the driver's seat side (D-seat side) area. As a result, the CPU 12 determines that the portable equipment is on the outside the passenger's seat side (P-seat side) (S8).

Thus, the portable equipment detecting system according to the first embodiment employs a two-axis (i.e., first element 21 and second element 22) antenna 20 and switches the power-supplied state three times only. Hence, the location of the portable equipment can be detected with a simple configuration and suitable response time. Specifically, the detecting system can detect where the portable equipment is located among the vehicle inside, the outside the driver's seat side and the outside the passenger's seat side. Further, comparing the detecting system which requires antennas on respective doors of the vehicle, since the detecting system detects the location of the portable equipment by only using the two axis antenna 20, the number of antenna unit can be reduced so that the manufacturing cost can be reduced.

According to the above-described embodiment, as shown in FIG. 3, the detecting system is configured to detect the portable equipment inside the vehicle when all doors of the vehicle are closed and all doors are locked, however, the present invention is not limited to those configuration. For instance, as a modification of the first embodiment, the detecting system may include a trigger input circuit 30 that triggers the control block 10 (CPU 12) so as to start the detecting of the portable equipment in the vehicle. In the portable equipment detecting system according to the above-described embodiment and the modification thereof, the same reference numbers are applied to the same configurations and the explanation thereof is omitted.

Figure 4:
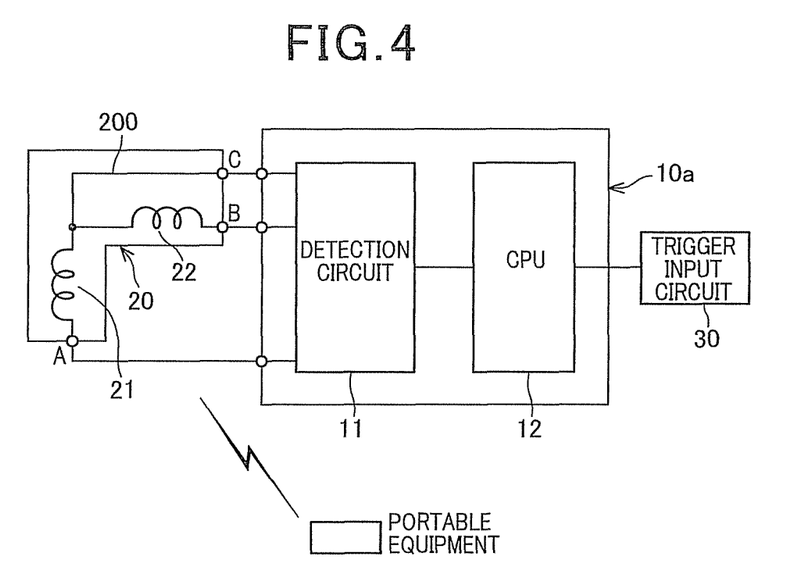
FIG. 4 is a block diagram showing an overall configuration of a portable equipment detecting system according to a modification of the first embodiment.

As shown in FIG. 4, in the portable equipment detecting system according to the modification, the trigger input circuit 30 is connected to the control block 10. The trigger input circuit 30 is configured to input signals from touch sensors or a push switches which are disposed on each door handles. The trigger input circuit 30 determines that the user is requesting lock or unlock of the doors of the vehicle when the signals from the touch sensors or the push switches are received and outputs a trigger signal to the control block 10 (CPU 12).

Figure 5:
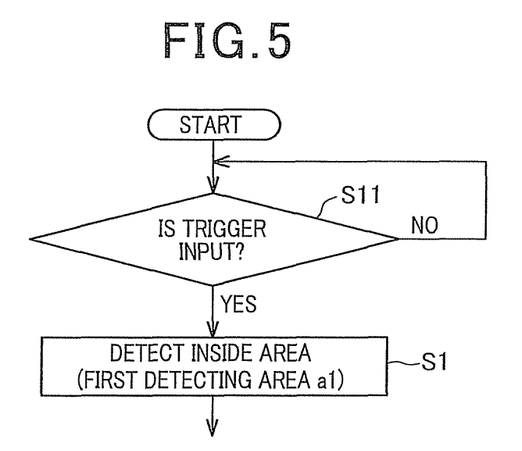
FIG. 5 is a flowchart showing an operation procedure of the portable equipment detecting system according to the modification of the first embodiment.

Next at step S11, as shown in FIG. 5, according to the modification of the portable equipment detecting system, the CPU 12 determines whether or not the trigger signal from the trigger input circuit 30 is present while the CPU 12 is powered. The CPU 12 proceeds to step S1 as shown in the flowchart of FIG. 3 when the trigger signal from the trigger input circuit 30 is present, and the CPU 12 repeatedly executes the procedure at step S11 when the trigger signal from the trigger signal input circuit 30 is not present. Thus, since the trigger input circuit 30 is provided, the trigger input circuit 30 can recognize which door the user is around. However, it is considered that the user who operates the touch sensor or the push switch does not necessarily have the portable equipment. Therefore, even when the trigger signal input circuit 30 outputting the trigger signal to the control circuit 10 (CPU 12) is provided, the portable equipment detecting system can be preferably used. In other words, the location of the portable equipment can be detected with a simple configuration and suitable response time. Moreover, only a single antenna which is the two-axis (i.e., first element 21 and second element 22) antenna 20 can be used to detect the location of the portable equipment. Therefore, comparing antennas disposed on the respective doors, the number of antennas can be reduced whereby the manufacturing cost can be reduced as well.

It is noted that the present invention is not limited to the above-described embodiment, however, various modification can be made within the scope of the invention.

Second Embodiment

Figure 6:
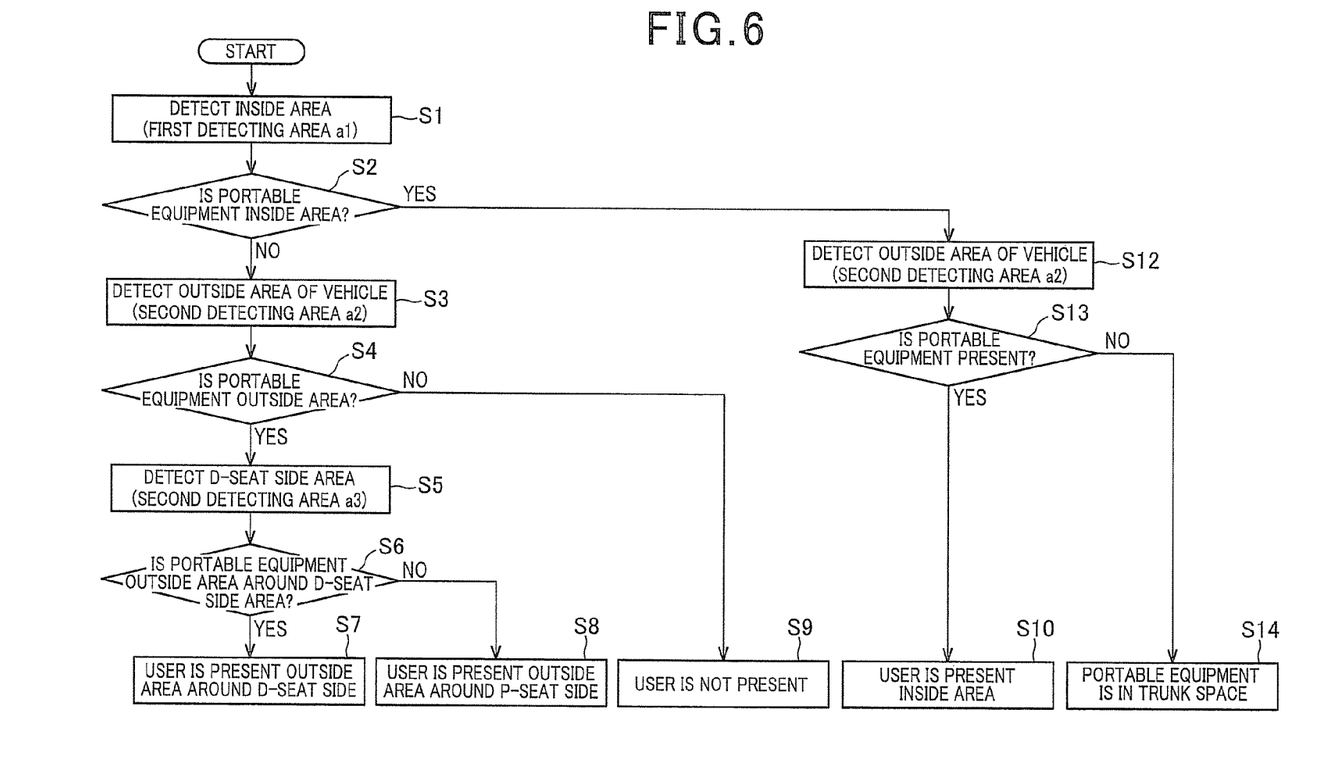
FIG. 6 is a flowchart showing an operation procedure of a portable equipment detecting system according to a modification of a second embodiment.

Next, with reference to FIG. 6, the portable equipment detecting system according to the second embodiment of the present invention is described. The overall configuration portable equipment detecting system according to the second embodiment is the same as the one of the first embodiment. Hence, the explanation thereof is omitted (Please see FIG. 1).

Regarding the operation procedure of the portable equipment detecting system according to the second embodiment, since most function blocks are identical to the function blocks of the first embodiment, the explanation for the identical blocks is omitted. In the flowchart as shown in FIG. 6, steps having the same contents of the flowchart as shown in FIG. 3 have the same step number. It is noted that the difference between the portable equipment detecting system according to the first embodiment and the portable equipment detecting system according to the second embodiment is whether or not the portable equipment is in the trunk space.

Specifically, in the portable equipment detecting system according to the second embodiment, when the CPU 12 determines that the portable equipment is inside the vehicle at step S2 as shown in FIG. 6 (FIG. 3), then proceeds to step S12.

Subsequently, at step S12, as similar to step S3 in FIG. 3, the second detecting area a2 is detected. At step S13 as shown in FIG. 6, it is determined whether or not the portable equipment is present. The CPU 12 determines whether or not the portable equipment is present when the second power-supplied state is set to form the second detecting area a2. Specifically, the CPU 12 verifies the ID code included in the acknowledge signal transmitted from the portable equipment and determines whether or not the portable equipment is present based on the verification result whether or not the ID code matches with the pre-registered code. When the verification result is true, it is determined that the portable equipment is inside the vehicle (YES at step S2) and inside the passenger cabin 41. In other words, it is determined that the user is present inside the vehicle (S10). On the other hand, when the verification result is false, it is determined that the portable equipment is inside the vehicle (YES at step S2) and is not in the passenger cabin 41 of the vehicle. As a result, the CPU 12 determines that the portable equipment is in the trunk space (S14).

Thus, the portable equipment detecting system according to the second embodiment employs the two-axis (first element 21 and second element 22) antenna 20 and switches the power-supplied states of the first element 21 and the second element 22 for four times only. Therefore, the portable equipment can be detected with a simple configuration and suitable response time. That is, the portable equipment detecting system can detect the area where the portable equipment is present from the areas comprising of the passenger's cabin, outside the driver's seat side and outside the passenger's seat. Further, comparing a detecting system having antennas disposed on the respective doors, the portable equipment detecting system according to the embodiment can detect the position of the portable equipment with only two-axis (first element 21 and second element 22) antenna 20 so that the number of antennas can be reduced thereby reducing the manufacturing cost as well.

Third Embodiment

Figure 7:
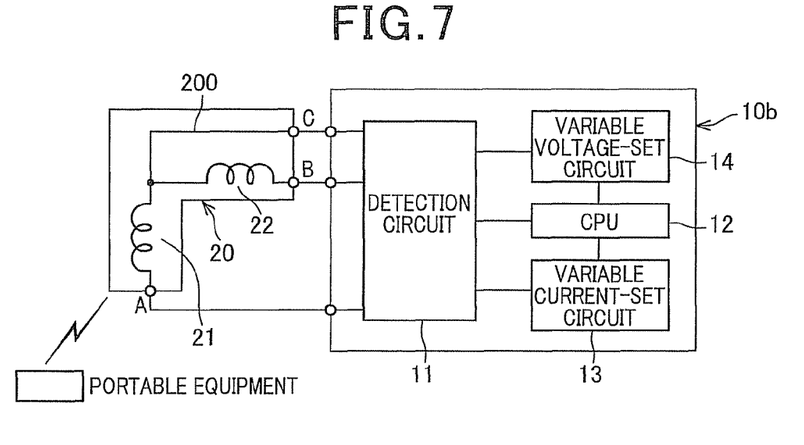
FIG. 7 is a block diagram showing an overall configuration of a portable equipment detecting system according to a modification of a third embodiment.

Next, with reference to FIGS. 7 to 9, hereinafter will be described a portable equipment detecting system according to a third embodiment. Since most function blocks configures the third embodiment are identical to the one of the above-described first embodiment, explanation thereof is omitted. For instance, in a block diagram as shown in FIG. 7, function blocks identical to those of the first embodiment are applied with the same reference numbers as the blocks in FIG. 1. The portable equipment detecting system according to the third embodiment differs from the one of the first embodiment in the power-supplied states, that is, a variable current-set circuit 13 and a variable voltage-set circuit 14 are added to the configuration used to make additional power-supplied states for the antenna 20 (i.e., first element 21 and second element 22), a fourth power-supplied state and a fifth power-supplied state.

As shown in FIG. 7, the portable equipment detecting system includes the variable current-set circuit 13 and the variable voltage-set circuit 14. The variable current-set circuit 13 is configured to set value of the output current based on a command from the CPU 12, the output current being supplied to the antenna 20 by the detecting circuit 11. Also, the variable voltage-set circuit 14 is configured to set value of the output voltage based on a command from the CPU 12, the output voltage being supplied to the antenna 20 by the detecting circuit 11.

The fourth power-supplied state is set such that the power supplied to the first element 21 is higher than the power supplied by the first power-supplied state. The detecting circuit 11 turns the connection points A and C to be ON and turns the connection point B to be OFF and controls the variable current-set circuit 13 and the variable current-set circuit 14 so as to set the power supplied to the first element 21 to be higher than that of the first power-supplied state. As a result, when the fourth power-supplied state is set, as shown in FIG. 8D, the detecting area for the portable equipment can be set to be inside and outside the vehicle, that is, the area includes from the inside the vehicle to outside the driver's seat side, outside the passenger's seat side and outside the trunk space. Those detecting area is defined as a fourth detecting area a14.

The fifth power-supplied state is defined such the power supplied to the second element 22 is set to be lower than that of the second power-supplied state. Specifically, the detecting circuit 11 turns the connection points B and C to be ON and turns the connection point A to be OFF and controls the variable current-set circuit 13 and the variable voltage-set circuit 14 so as to set the power supplied to the second element 22 to be smaller than that of the second power-supplied state. As a result, when the fifth power-supplied state is set, as shown in FIG. 8B, the detecting area for the portable equipment can be reduced to one fourth of the area of the passenger cabin 41. This detecting area is defined as a fifth detecting area a12.

Figure 8A:
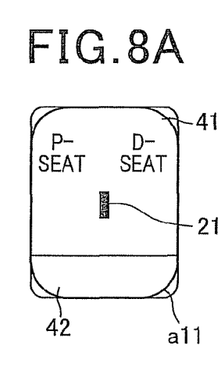
FIGS. 8A, 8B, 8C, 8D and 8E are explanatory diagrams showing an arrangement of a first element 21 and a second element 22 of the vehicle and a range of arriving electromagnetic waves according to the third embodiment.
Figure 8B:
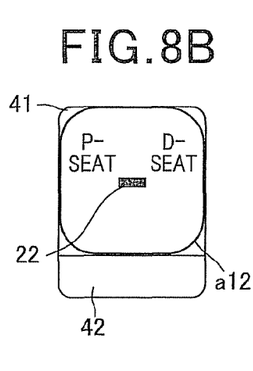
Figure 8C:
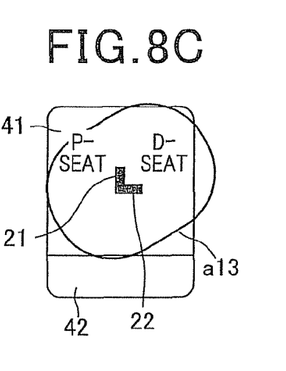
Figure 8D:
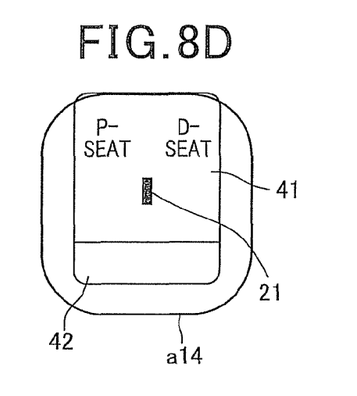
Figure 8E:
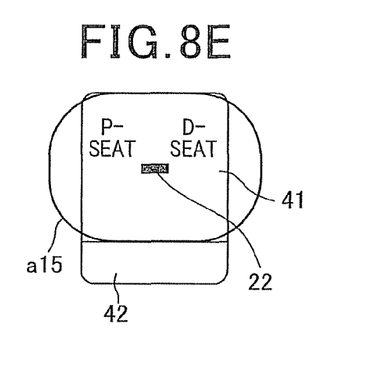

The first detecting area all as shown in FIG. 8A according to the third embodiment has the same area as the first detecting area a1 in the first embodiment. The second detecting area a15 as shown in FIG. 8E according to the third embodiment has the same area as the second detecting area a2 in the first embodiment. The third detecting area a13 as shown in FIG. 8C according to the third embodiment has the same area as the third detecting area a3 in the first embodiment.

Figure 9:
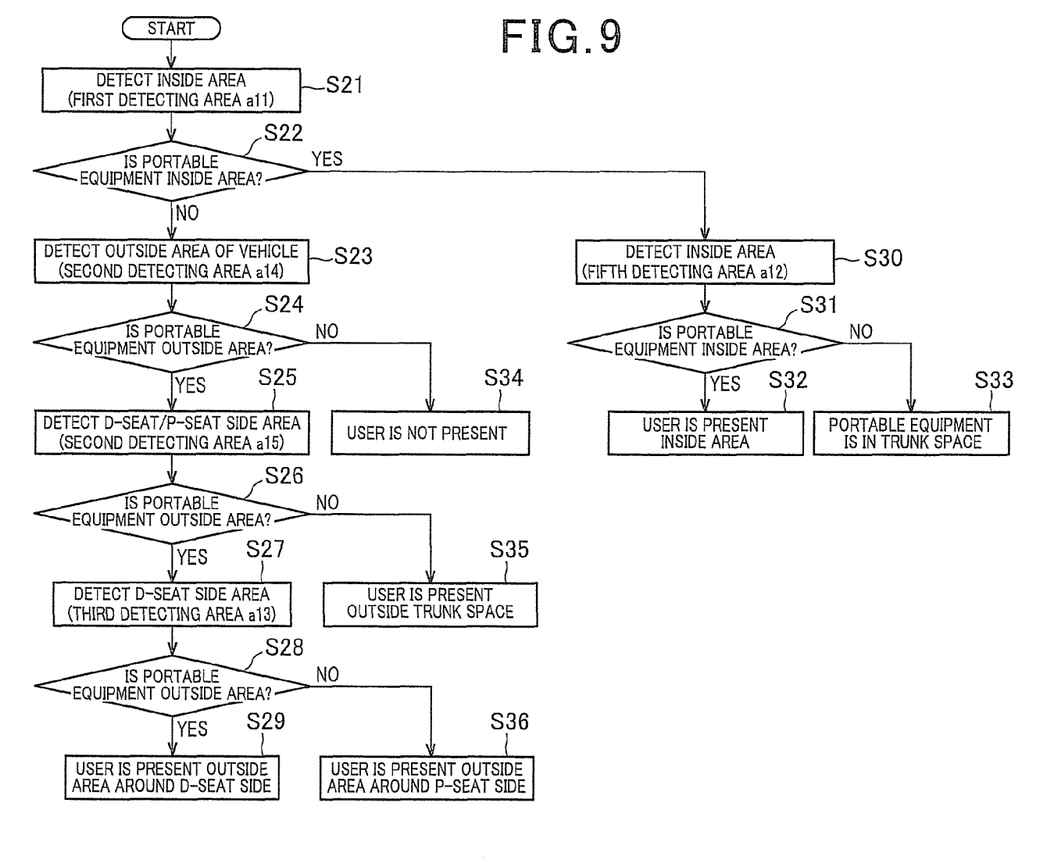
FIG. 9 is a flowchart showing an operation procedure of the portable equipment detecting system according to a modification of the third embodiment.

With reference to a flowchart as shown in FIG. 9, an operating procedure of the portable equipment detecting system according to the third embodiment is described as follows. It is noted that the flowchart as shown in FIG. 9 is activated when all doors are closed and locked, and is repeatedly executed at a predetermined period.

At step S21, inside area of the vehicle is detected. At this point, the detecting circuit 11 turns the connection points A and C to be ON and turns the connection point B to be OFF whereby the bypass wiring 200 and the first element 21 are electrically conducted to set the power-supplied state to be the first power-supplied state in which the first element 21 is powered. As shown in FIG. 8A, since the power is supplied to the first element 21 of which longitudinal direction is set to be the running direction of the vehicle, the first detecting area all covering the inside the vehicle can be formed. That is, the request signal is transmitted within the first detecting area all.

At step S22, it is determined whether or not the portable equipment is inside the vehicle. In particular, when the first detecting area all is formed as the first power-supplied state, the CPU 12 verifies the ID code included in the acknowledge signal transmitted by the portable equipment by comparing with the pre-registered code and then, based on the verification result (i.e., true or false), the CPU 12 determines whether or not the portable equipment is inside the vehicle. When the verification result is true, it is determined that the portable equipment is inside the vehicle and proceeds to step S30. On the other hand, when the verification result is false, it is determined that the portable equipment is not in the vehicle inside, and proceeds to step S23.

At step S23, outside area of the vehicle is detected. At this point, the detecting circuit 11 turns the connection points A and C to be ON and turns the connection point B to be OFF whereby the bypass wiring 200 and the first element 21 are electrically conducted to set the power-supplied state to be fourth power-supplied state in which higher power than that of the first power-supplied state is supplied to the first element 21. At this point, a fourth detecting area can be formed. As shown in FIG. 8D, the fourth detecting area is extending from inside the vehicle to outside the driver's seat side area, outside the passenger's seat side area and outside the trunk space. That is, the request signal is transmitted within the fourth detecting area a14.

At step S24, it is determined whether or not the portable equipment is outside the vehicle. In particular, when the fourth detecting area a14 is formed as the fourth power-supplied state, the CPU 12 verifies the ID code included in the acknowledge signal transmitted by the portable equipment by comparing with the pre-registered code and then, based on the verification result (i.e., true or false), the CPU 12 determines whether or not the portable equipment is inside the vehicle. When the verification result is true, it is determined that the portable equipment is not inside the vehicle (NO at step S22) and is outside the vehicle, and proceeds to step S25. On the other hand, when the verification result is false, it is determined that the portable equipment is not inside the vehicle (NO at step S22) and is not outside the vehicle. That is, at step S34, it is detected that the user is not present.

At step S25, the detecting area is set to be the driver's seat side and the passenger's seat side (D/P seats area). The CPU 12 controls the connection points B and C to be ON and the connection point A to be OFF so that the bypass wiring 200 and the second element 22 are electrically conducted to set the power-supplied state to be second power-supplied state in which the power is supplied to the second element 22. As shown in FIG. 8E, since the power is supplied to the second element 22 of which longitudinal direction equals to a direction perpendicular to both the running direction of the vehicle and the vertical direction of the vehicle, the second detecting area a15 can be formed. That is, the request signal is transmitted within the second detecting area a15.

At step 26, it is determined whether or not the portable equipment is outside the vehicle (driver's seat area and passenger's seat area). In particular, when the second detecting area a15 is formed as the second power-supplied state, the CPU 12 verifies the ID code included in the acknowledge signal transmitted by the portable equipment by comparing with the pre-registered code and then, based on the verification result (i.e., true or false), the CPU 12 determines whether or not the portable equipment is outside the vehicle. When the verification result is true, it is determined that the portable equipment is not inside the vehicle (NO at step S22) and is either outside the driver's seat side or outside the passenger's seat side, then proceeds to step S27. On the other hand, when the verification result is false, it is determined that the portable equipment is not inside the vehicle (NO at step S22) and is outside the vehicle (YES at step S24), and is not outside the driver's/passenger's seat side. That is, at step S35, the user is detected at outside the trunk space.

At step 27, detecting area is set to be the driver's seat side (D-seat side) area. The detection circuit 11 controls the connection points A and B to be ON and controls the connection point C to be OFF whereby the third power-supplied state is set. As shown in FIG. 8C, the power is supplied to both the first element 21 and the second element 22 so that the third detecting area a13 is formed by interaction of two electromagnetic waves radiated from the first element 21 and the second element 22. That is, the request signal is transmitted within the third detecting area a13.

At step S28, detecting area is set to be outside the driver's seat side (D-seat side) area. In particular, when the third detecting area a13 is formed as the third power-supplied state, the CPU 12 verifies the ID code included in the acknowledge signal transmitted by the portable equipment by comparing with the pre-registered code and then, based on the verification result (i.e., true or false), the CPU 12 determines whether or not the portable equipment is outside the vehicle. When the verification result is true, it is determined that the portable equipment is outside the driver's seat side. That is, at step S29, the user is detected outside the driver's seat side (D-seat side). On the other hand, when the verification result is false, it is determined that the portable equipment is outside the driver's seat side and the passenger's seat side (YES at step S26), and is not outside the driver's seat side. That is, at step S36, the user is detected in passenger's seat side area (P-seat side).

At step 30 which is executed when the verification result at step S22 is true, inside the vehicle is detected. The detecting circuit 11 turns the connection points 13 and C to be ON and turns the connection point A to be OFF whereby the bypass wiring 200 and the second element 22 are electrically conducted to set the power-supplied state to be fifth power-supplied state in which smaller power than that of the second power-supplied state is supplied to the first element 21. At this point, as shown in FIG. 8B, the fifth detecting area a12 is only formed in the passenger cabin 41 of the vehicle. That is, the request signal is transmitted within the fifth detecting area a12.

At step S31, it is determined whether or not the portable equipment is inside area (passenger cabin 41). Specifically, when the fifth detecting area a12 is formed by setting the fifth power-supplied state, the CPU 12 verifies the ID code included in the acknowledge signal transmitted by the portable equipment by comparing with the pre-registered code and then, based on the verification result (i.e., true or false), the CPU 12 determines whether or not the portable equipment is inside the vehicle. When the verification result is true, it is determined that the portable equipment is inside the vehicle (YES at step S22), and is in the passenger cabin 41. That is, at step S32, the user is detected inside the vehicle (passenger cabin 41). On the other hand, when the verification result is false, it is determined that the portable equipment is inside the vehicle (YES at step S22) and is not in the passenger cabin 41. That is, at step S33, the CPU 12 determines that the portable equipment is in the trunk space.

Thus, when the first power-supplied state is set and no acknowledge signal is detected, and when the fourth power-supplied state is set and the acknowledge signal transmitted by the portable equipment is detected, and the CPU 12 detects no acknowledge signal from the portable equipment when the second power-supplied state is detected, the CPU 12 can determine that the portable equipment is in the trunk space.

Further, when the fifth power-supplied state is set, a range of the arriving electromagnetic waves (i.e., transmitting range of the request signal) can be set as inside the passenger cabin. As a result, when the first power supplied state is set, if the acknowledge signal from the portable equipment is detected and when the second power-supplied state is set, if no acknowledge signal is detected, it is detected that the portable equipment is in the trunk space of the vehicle.

The portable equipment detecting system according to the third embodiment employs the two-axis (first element 21 and second element 22) antenna 20 and switches the power-supplied state of these first element 21 and second element 22 only for five times whereby the portable equipment can be detected with minimized configuration. In more detail, it is detected an area where the portable equipment is present from among passenger cabin, outside the driver's seat side, outside the passenger's seat side, inside the trunk space and outside the trunk space side. Moreover, the position of the portable equipment can be detected by using only the two-axis (first element 21 and second element 22) antenna 20 so that the number of antennas can be reduced. As a result, manufacturing cost can be reduced.

Figure 10:
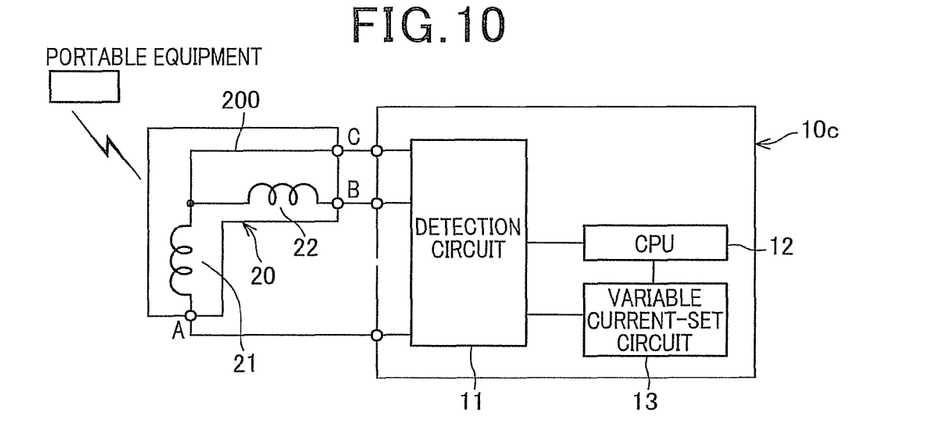
FIG. 10 is a block diagram showing an overall configuration of a portable equipment detecting system according to a first modification of the third embodiment.
Figure 11:
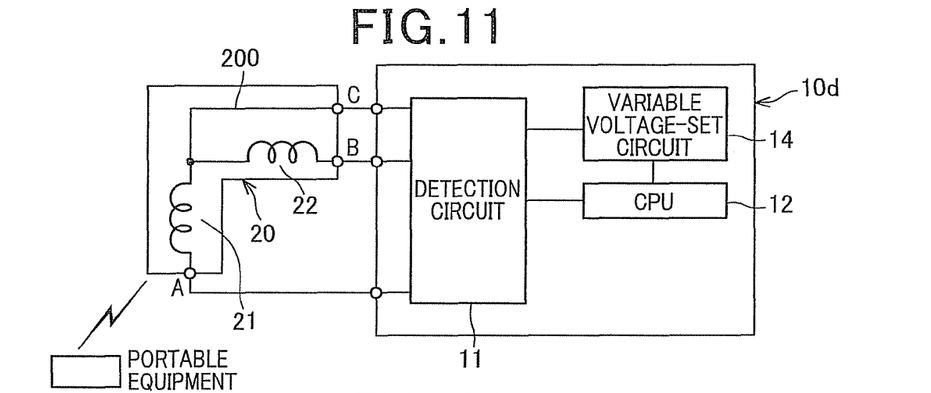
FIG. 11 is a block diagram showing an overall configuration of a portable equipment detecting system according to a second modification of the third embodiment.

According to the third embodiment, the portable detecting system employs both variable current-set circuit 13 and variable voltage-set circuit 14. However, the present invention is not limited to those of the third embodiment. Specifically, as shown in FIG. 10, as a first modification of the third embodiment, only the variable current-set circuit 14 can be employed to adjust supplying power.

Further, in the portable equipment detecting system according to the third embodiment, the fourth power-supplied state and the fifth power-supplied state are added comparing to the portable equipment detecting system of the first embodiment. However, the portable equipment detecting system can be configured to employ either fourth power-supplied state or the fifth power-supplied state in addition to the first embodiment. That is, even in a configuration by only adding fourth power-supplied state to the first embodiment, it is detected whether or not the portable equipment is outside the trunk space of the vehicle. Also, the same applies to a configuration in which the fifth power-supplied state is added.

Fourth Embodiment

Figure 12:
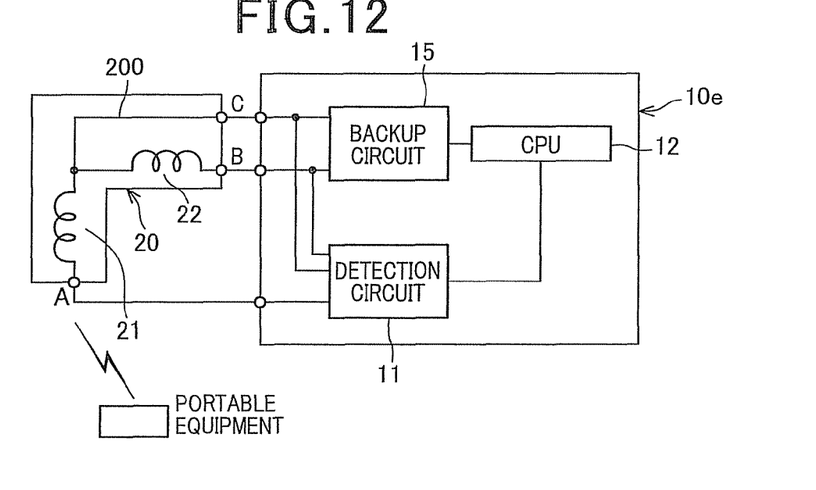
FIG. 12 is a block diagram showing an overall configuration of a portable equipment detecting system according to a fourth embodiment.

With reference to the FIGS. 12 and 13, hereinafter will be described a portable equipment detecting system according to a fourth embodiment. Since most function blocks configures the fourth embodiment are identical to the one of the above-described first embodiment, explanation thereof is omitted. For instance, in a block diagram as shown in FIG. 12, function blocks identical to those of the first embodiment are applied with the same reference numbers as the blocks in FIG. 1. The portable equipment detecting system according to the fourth embodiment which differs from the one of the first embodiment is that a backup circuit is added to the configuration of the fourth embodiment.

For instance, when the portable equipment is powered by a battery, it is considered that the portable equipment cannot communicate with the portable equipment detecting system due to consumption of the battery. Hence, even in this case, the backup circuit disposed in the vehicle helps the portable equipment to generate necessary power so as to communicate with the portable equipment detecting system. The backup circuit is arranged at a portion where the portable equipment can be placed in the vehicle. The backup circuit generates electromagnetic field to be used for the portable equipment when the portable equipment does not return an acknowledge signal nevertheless a start switch (or ignition key) disposed in the passenger's cabin is turned ON. Meanwhile, the portable equipment includes a generation circuit for generating electromotive force, and the generation circuit is configured to generate the electromotive force by the electromagnetic field generated by the backup circuit. Therefore, even when the battery power of the portable equipment is consumed deeply, the communication between the portable equipment detecting system and the portable equipment can be maintained. Therefore, the portable equipment adapted to the portable equipment detecting system according to the fourth embodiment, includes a transponder which is driven by the electromotive force induced by the electromagnetic field received externally, and the transponder transmits an acknowledge signal.

As shown in FIG. 12, the portable equipment detecting system according to the fourth embodiment includes a backup circuit 15. Based on a command from the CPU 12, the backup circuit 15 supplies the first element 21 and the second element 22 with an electric power higher than the power of the electromagnetic waves used for transmitting the request signal whereby the electromagnetic field used for inducing the electromotive force is generated at the portable equipment.

Figure 13:
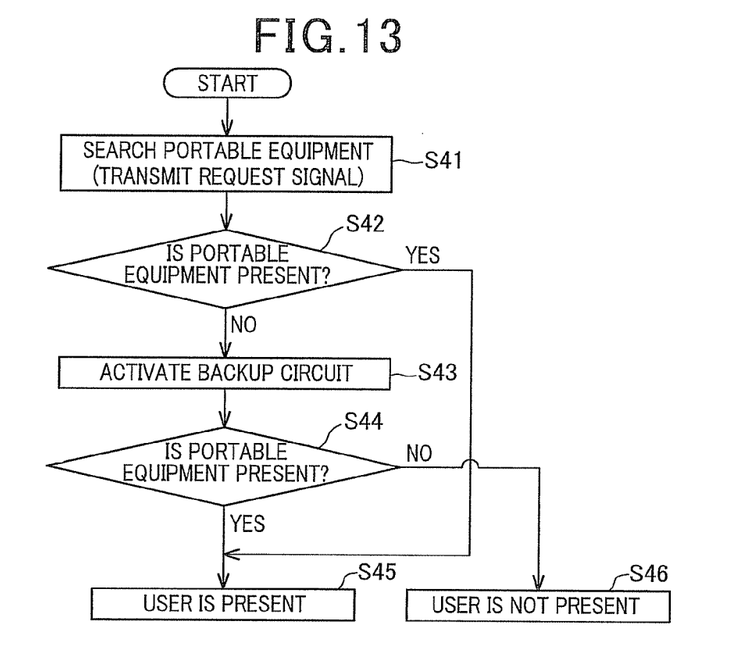
FIG. 13 is a flowchart showing an operation procedure of the portable equipment detecting system according to the fourth embodiment.

With reference to a flowchart as shown in FIG. 13, hereinafter is described an operating procedure regarding the portable equipment detecting system according to the fourth embodiment. It is noted that the operating procedure shown by the flowchart 13 is executed when the start switch (ignition key) disposed in the passenger cabin is turned ON.

At step S41, the detecting circuit 11 transmits a request signal by radiating electromagnetic waves. That is, the detecting circuit 11 turns the connection points A and C to be ON and the turns the connection point B to be OFF so that the first power-supplied state is set where the power is supplied to the first element 21 via the bypass wiring 200 and the first element 21. For instance, as shown in FIG. 8A according to the third embodiment, the first detecting area a11 (i.e., area inside the vehicle) is formed. In other words, the request signal is transmitted within the first detecting area.

At step 42, it is determined whether or not the portable equipment is present. That is, when the first detecting area a11 is formed as the first power-supplied state, the CPU 12 verifies the ID code included in the acknowledge signal transmitted by the portable equipment by comparing with the pre-registered code and then, based on the verification result (i.e., true or false), the CPU 12 determines whether or not the portable equipment is inside the vehicle. When the verification result is true, it is determined that the portable equipment is inside the vehicle and proceeds to step S45 (i.e., user detected).

Meanwhile, when the verification result is false, the CPU 12 determines the portable equipment is not inside the vehicle and proceeds to step S43. At this time, it is considered that the acknowledge signal from the portable equipment is not present nevertheless the start switch (ignition switch) is turned ON. Hence, it is possible that the portable equipment cannot output the acknowledge signal because the battery-power of the portable equipment is too low.

Accordingly, at step S43, the backup circuit is activated. Based on a command from the CPU 12, the backup circuit 15 supplies the first element 21 and the second element 22 with an electric power higher than the power of the electromagnetic waves used for transmitting the request signal whereby the electromagnetic field used for inducing the electromotive force is generated at the portable equipment. Assuming the portable equipment is inside the vehicle, the portable equipment can transmit the acknowledge signal which is driven by the electromotive force induced by the electromagnetic waves.

At step S44, it is determined whether or not the portable equipment is present. That is, while the backup circuit is operating, the CPU 12 verifies the ID code included in the acknowledge signal transmitted by the portable equipment by comparing with the pre-registered code and then, based on the verification result (i.e., true or false), the CPU 12 determines whether or not the portable equipment is inside the vehicle. When the verification result is true, it is determined that the portable equipment is inside the vehicle and proceeds to step S45 (i.e., user detected). On the other hand, when the verification result is false the CPU 12 determines that the portable equipment is not inside the vehicle and proceeds to step S46. Hence, at the step S46, it is determined that the user is not present.

Thus, an antenna used for mutual communication between the portable equipment and the portable equipment detecting system, and an antenna used for the backup can be integrated whereby the number of antennas can be reduced.

In the embodiments as described above, the antenna 20 including the first element 21 and the second element 22 is used for the portable equipment detecting system. However, the present invention is not limited to these embodiments.

Figure 14:
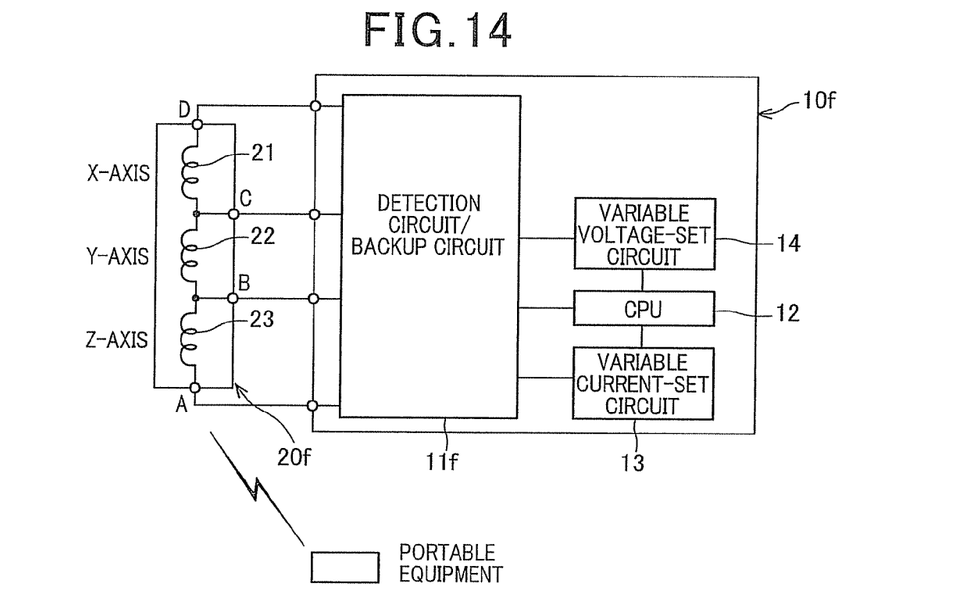
FIG. 14 is a block diagram showing an overall configuration of a portable equipment detecting system according to a modification of the fourth embodiment.

Specifically, as shown in FIG. 14, as a modification of the fourth embodiment, the portable equipment detecting system can be adapted to an antenna 20f including a third element 23 in addition to the first element 21, the second element As described above, the first element 21 is arranged such that the longitudinal direction of thereof is set to be the running direction of the vehicle and the second element 22 is arranged such that the longitudinal direction thereof is set to be a direction perpendicular to both of the running direction of the vehicle and the vertical direction of the vehicle. The third element 23 is arranged such that the longitudinal direction thereof equals to a vertical direction of the vehicle. That is, assuming the direction of the first element 21 is X-axis and the direction of the second element 22 is Y-axis, the direction of the third element becomes Z-axis. Thus, these elements (i.e., first element 21, second element 22, and third element 23) can be arranged three-dimensionally (forming three-dimensional shape).

Accordingly, when the antenna is used for the backup circuit, regardless of a direction where the portable equipment is heading, the induced electromotive force can be generated so that the detecting system appropriately backs the portable equipment up. Note that the third element 23 may be arranged to be combined with the bypass wiring 200.

What is claimed is:

1. A portable equipment detecting system mounted on a vehicle, communicating with a portable equipment by wireless communication thereby detecting a location of the portable equipment, the detecting system comprising:

an antenna radiating electromagnetic waves, the antenna including a first element, a second element electrically connected in series to the first element, and a bypass wiring of which one end of the wiring is connected to a connection point of the first and second elements, the antenna being arranged such that a longitudinal direction of the first element is defined as a running direction of the vehicle and a longitudinal direction of the second element is defined as a direction perpendicular to both of the running direction of the vehicle and a vertical direction of the vehicle;

transmitting means for transmitting a request signal requesting the portable equipment to return an acknowledge signal, the request signal being transmitted to the antenna thereby radiating the electromagnetic waves including the request signal;

receiving means for receiving the acknowledge signal from the portable equipment via the antenna which receives the electromagnetic waves including the acknowledge signal; and detecting means for detecting the location of the portable equipment based on the acknowledge signal returned by the portable equipment, wherein power is supplied to the antenna in one of three supplied states including a first supplied state, a second supplied state and a third supplied state, wherein the first supplied state is configured such that the bypass wiring and the first element are electrically conducted to supply the power only to the first element, the second supplied state is configured such that the bypass wiring and the second element is electrically conducted to supply the power only to the second element and the third supplied state is configured such that the power is supplied to the first and second elements, the detecting means is configured to switch between three supplied states and detect the location of the portable equipment based on the acknowledge signal at a time when the supplied state is switched.

2. The detecting system according to claim 1, wherein the supplied states further includes a fourth supplied state in which power supplied to the first element is higher than that of the first supplied state.

3. The detecting system according to claim 1, wherein the supplied states further includes a fifth supplied state in which power supplied to the second element is smaller than that of the second supplied state.

4. The detecting system according to claim 2, wherein the supplied states further includes a fifth supplied state in which power supplied to the second element is smaller than that of the second supplied state.

5. The detecting system according to claim 1, further comprising backup circuit that supplies power to the first and second elements to generate electromagnetic field to be used for inducing electromotive force on the portable equipment, and the power supplied to the first and second element is higher than the power when radiating the electromagnetic waves to transmit the request signal.

6. The detecting system according to claim 2, further comprising backup circuit that supplies power to the first and second elements to generate electromagnetic field to be used for inducing electromotive force on the portable equipment, and the power supplied to the first and second element is higher than the power when radiating the electromagnetic waves to transmit the request signal.

7. The detecting system according to claim 3, further comprising backup circuit that supplies power to the first and second elements to generate electromagnetic field to be used for inducing electromotive force on the portable equipment, and the power supplied to the first and second element is higher than the power when radiating the electromagnetic waves to transmit the request signal.

8. The detecting system according to claim 5, wherein the antenna further includes a third element, the antenna being arranged to form three-dimensional shape by the first element, the second element and the third element.

* * * * *